Oct. 6, 1964     ORI ISHAI ETAL     3,151,842
WIRE TENSIONING DEVICE
Filed July 5, 1963

INVENTORS.
ORI ISHAI
EDWIN BOUSSO
BY Bierman & Bierman
ATTORNEYS

3,151,842
WIRE TENSIONING DEVICE
Ori Ishai and Edwin Bousso, Haifa, Israel, assignors to Technion Research & Development Foundation, Ltd., Haifa, Israel
Filed July 5, 1963, Ser. No. 292,834
4 Claims. (Cl. 254—67)

This invention relates to wire tensioning devices and in particular to devices of the kind which are used in the tensioning of wires employed in the pre-stressing of concrete. It has hitherto been known to employ for this purpose, hydraulically operated tensioning devices. In view of the fact that such devices require the provision of a pump, the devices tend to become extremely bulky and do not lend therselves to easy transportation and handling.

It is an object of the present invention to provide a new and improved wire tensioning device which, while being extremely effective in tensioning the wires, is compact and readily portable.

According to the present invention there is provided a wire tensioning device comprising a hollow screw through which the wire to be tensioned is adapted to pass, a wire clamping means disposed adjacent to the mouth of the screw and capable of relative rotational movement with respect to the screw, a threaded sleeve surrounding the screw, the thread of the sleeve and the screw together defining a ball race in which are located balls forming part of a ball bearing screw, a turning collar, a first coupling means for coupling the turning collar to the sleeve so as to permit relative rotation of the sleeve and turning collar only in one sense, a locking collar, a second coupling means for coupling the locking collar to the sleeve so as to permit relative rotation of the sleeve and locking collar only in an opposite sense and third coupling means for coupling the locking collar to the screw so as to prevent a relative rotational movement of the locking collar with respect to the screw whilst permitting translational movement of the collar in an axial direction with respect to the screw.

With a wire tensioning device in accordance with the present invention, a very high degree of efficiency can be obtained in view of the provision of the ball bearing between the threads of the screw and the sleeve. In fact with such a screw (hereinafter referred to as a ball screw) efficiencies of up to 98% can be achieved. In consequence, a high degree of tensioning of the wires can be achieved manually with the expenditure of a minimum amount of effort by the operator.

One embodiment of the invention will now be described by way of example and with reference to the accomping drawings, in which.

Figure 3:
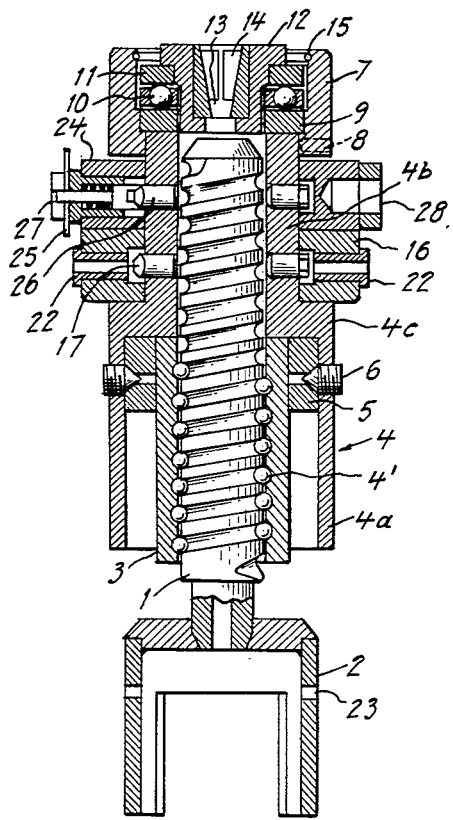
FIG. 3 is a longitudinal sectional view on an enlarged scale of the device shown in FIG. 1.

As seen in the drawings and in particular in FIG. 3 thereof, the device comprises a hollow elongated screw 1 which is secured at its lower end to a bifurcated base 2. An internally threaded sleeve 3 surrounds the screw 1, the threads of the sleeve 3 and the screw 1 defining together a ball race, in which ride a plurality of balls 4' constituting a ball bearing. A communicating duct (not shown in the drawings) is provided, secured to the inner sleeve 3 by means of which the balls 4' pass from the upper end of the ball track to the lower end thereof. The sleeve 3 is surrounded by an outer cylinder 4, spaced from the sleeve 3 and coupled thereto through locking members 5 secured to the sleeve 3 and attached to the cylinder 4 by means of bolts 6. The lower half 4a of the cylinder 4 merges into the upper half 4b thereof via a stepped portion 4c. The cylinder portion 4b closely surrounds the upper half of the screw 1.

Fitted around the upper end of the cylinder portion 4b is a cylindrical holder 7 secured to the cylindrical portion 4b by means of a bolt 8. The holder 7 is secured to an inwardly located annulus 9 which, as shown in the drawings, rests on the upper edge of the cylindrical portion 4b. The annulus 9 carries an annular ball bearing 10 on which in turn rests a ring 11, secured to a wire clamp support 12. The support 12 has located in the central tapering bore 13 thereof, a split tapering wire clamp 14 having internally serrated surfaces. The wire clamp support 12 is maintained in position in the cap 7 by means of a spring ring 15 which is located within a groove formed in the inner wall of the cap 7.

Figure 1:
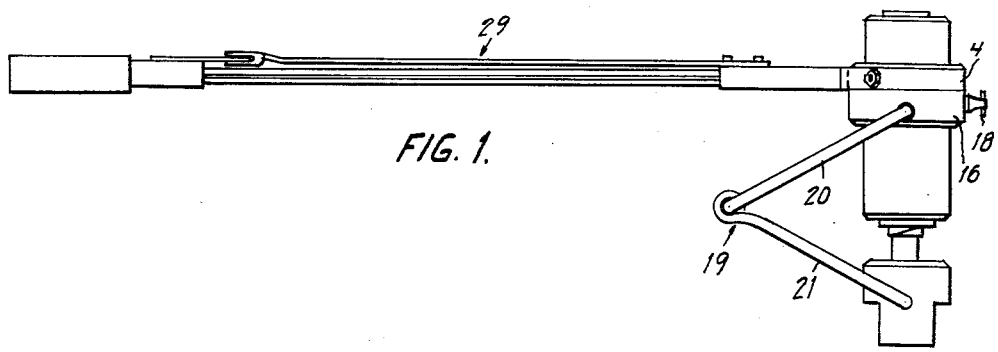
FIG. 1 is a side elevation of an assembled tensioning device in accordance with the invention.
Figure 2:
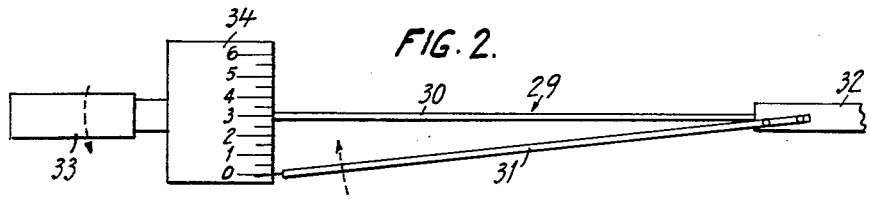
FIG. 2 is a plan view of a combined turning handle and tensioning indicator used in the device shown in FIG. 1.

A locking collar 16 surrounds the cylindrical portion 4b and rests on the stepped portion 4c. This collar 16 is provided with an inwardly radially directed pinion (not seen in the drawings), this pinion being spring biased into engagement with a like plurality of ratchet teeth 17 secured to and extending radially outwardly from the cylindrical portion 4b. The ratchet teeth 17 are so shaped as to permit relative rotational movement of the collar 16 with respect to the cylinder 4 in a clockwise direction. In order to release the locking collar 16 for movement in a counter-clockwise direction, each of the pinions is provided with a head portion 18 (see FIG. 1) enabling the withdrawal of the pinion from engagement with the ratchet teeth. When the pinions are so withdrawn, the locking collar 16 can be rotated in either direction with respect to the cylinder 4.

Additionally, the locking collar 16 is prevented from rotation with respect to the base 2 and, therefore, with respect to the screw 1, by means of a locking framework 19 which comprises 2 V-shaped portions 20 and 21 which are linked at their apices. The free ends of the V-shaped portion 20 are retained in apertures 22 formed in the locking collar 16 whilst the free ends of the portion 21 are retained in apertures 23 formed in the base 2. The locking framework 19 is thus constructed as to permit relative translational movement of the collar 16 with respect to the base 2 in an axial direction but so as to prevent relative rotational movement of the collar 16 with respect to the base 2.

A turning collar 24 is located above the locking collar 16 and surrounds the cylindrical portion 4b. The collar 24 is provided with radially inwardly directed pinions 25 which are spring biased into contact with a plurality of outwardly directed ratchet teeth 26, secured to the cylindrical portion 4b. The ratchet teeth 26 are so shaped as to permit relative rotational movement of the collar 24 with respect to the cylinder 4 only in counter-clockwise direction. Each of the pinions 25 is provided with a head 27, outward displacement of which results in the disengagement of the pinions 25 from the ratchet teeth 26, thereby permitting relative rotational movement of the collar 24 with respect to the cylinder 4 in either direction.

An aperture 28 is formed in the collar 24 and is designed to receive the end of a combined turning handle and tension indicator 29. This combined handle and indicator 29 comprises a pair of steel rods 30 of known torque resistance and an indicator pointer 31. The indicator pointer 31 and the rods 30 are secured together to a common terminal bar 32 which is adapted to be inserted into the aperture 28 of the collar 24. The rods 30 carry at their ends remote from the bar 32, a handle 33 and a tension gauge 34.

In operation the end of the wire to be tensioned is passed through the screw 1 and is gripped by the wire clamp 14. Upon turning of the handle 33 in a counter-clockwise direction with respect to the screw 1, the pinions 25 engage with the ratchet teeth 26 causing the cylinder 4 and the sleeve 3 to rotate in this counter-clockwise direction. In consequence, the cylinder 4 and the wire clamp support 12 is moved axially with respect to the screw thereby tensioning the wire. With the increasing tensioning of the wire the latter is gripped still more firmly by the wire clamp 14 and, in addition, the base 2 is pressed firmly against a supporting surface (not shown). The rotation of the cylinder 4 in the counter-clockwise direction also takes place relative to the locking collar 16 by virtue of the fact that in this direction the pinions of the locking collar 16 ride over the ratchet teeth 17 thereof.

Upon release of the turning torque applied to the handle 33, the extremely high efficiency of the device would tend to make the cylinder 4 and the sleeve 3 rotate in the opposite, clockwise direction under the tension of the wire. This, however, is prevented in view of the fact that any such clockwise rotation of the cylinder would result in its engagement with the locking collar 16 and any tendency of the latter collar to rotate with respect to the screw and the base is prevented by the provision of the locking framework 19.

The provision of the combined turning handle and tension indicator 29 gives a direct indication on the tension gauge 34 of the torque which has to be applied to the turning collar 16 in order to tension the wire. In consequence, therefore, the gauge 34 and the position of the pointer 31 thereon indicates the tension of the wire at any particular time.

We claim:
1. A wire tensioning device comprising a hollow screw through which a wire to be tensioned is adapted to pass, a wire clamping means adjacent one end of said screw and capable of rotational movement relative thereto, a threaded sleeve surrounding said screw, the thread of said sleeve and the screw together defining a ball race in which are located balls forming part of a ball bearing, a cylinder surrounding said screw and rotationally immovable with respect to said sleeve, a turning collar surrounding one of said cylinder and said sleeve, a first coupling means between said collar and one of said cylinder and said sleeve permitting rotation of said collar relative to one of said cylinder and said sleeve in only one direction, a locking collar surrounding one of said cylinder and said sleeve and axially adjacent said turning collar, a second coupling means between said locking collar and one of said cylinder and said sleeve permitting rotation of said locking collar relative to one of said cylinder and said sleeve in a direction opposite to said one direction and a third coupling means preventing relative rotational motion and permitting axial motion between said locking collar and said screw.

2. A wire tensioning device according to claim 1, wherein said first and second coupling means respectively include oppositely directed pinion and ratchet arrangements.

3. A wire tensioning device according to claim 1, wherein said third coupling means consists of a framework comprising two V portions coupled together at their apices, the free ends of one V portion being coupled to the locking collar and the free ends of the other V portion being coupled to said screw.

4. A device according to claim 1, wherein there is provided a combined turning handle and tension indicator comprising at least one elongated rod of known torque resistance, an indicator pointer coupled to said rod and a tension gauge carried by said rod and disposed adjacent said pointer.

References Cited in the file of this patent

UNITED STATES PATENTS

| 1,396,229 | Neth | Nov. 8, 1921 |
| 2,865,600 | Roelding | Dec. 23, 1958 |
| 3,046,808 | De Mart | July 31, 1962 |

FOREIGN PATENTS

| 521,404 | Belgium | July 31, 1953 |
| 821,075 | Great Britain | Sept. 30, 1959 |